No. 717,271. Patented Dec. 30, 1902.
J. RASMUSSON.
BICYCLE PROP.
(Application filed May 7, 1902.)
(No Model.)
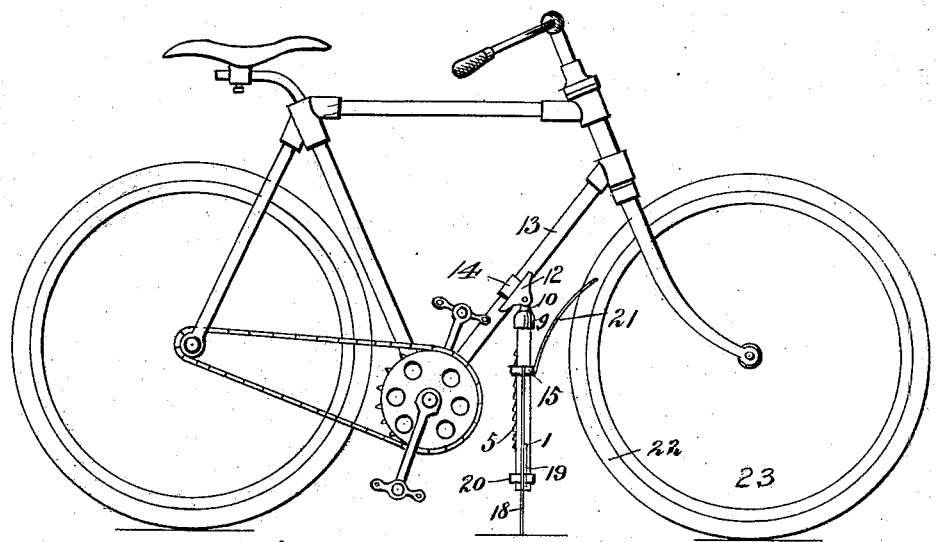
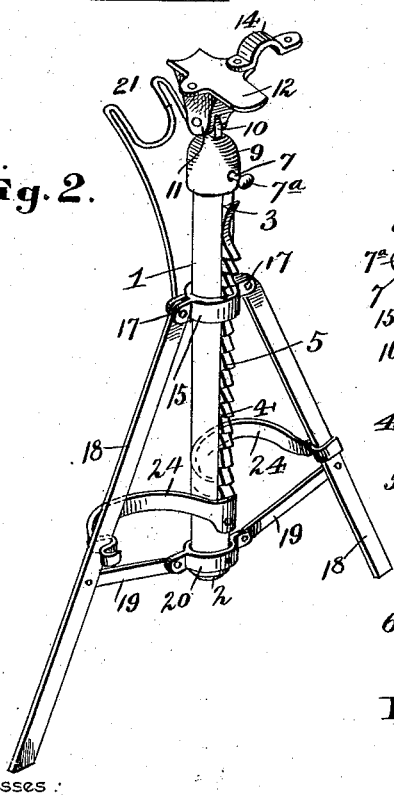
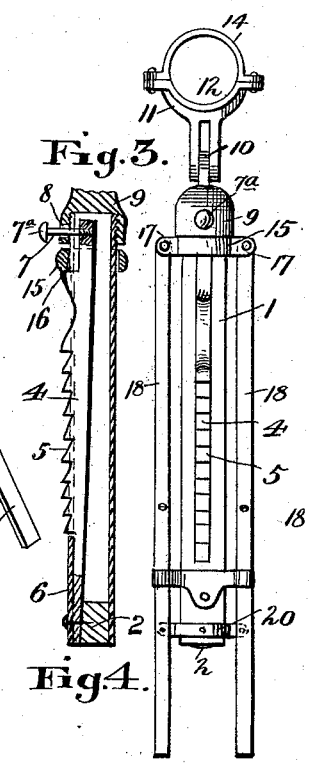
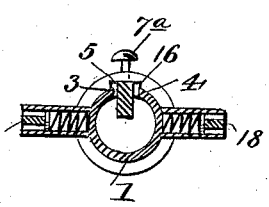
Witnesses: F. L. Ourand. Frank G. Radlfinger.
Inventor: Jens Rasmusson, by Lans Bagger & Co., Attorneys.

UNITED STATES PATENT OFFICE.

JENS RASMUSSON, OF ROCHESTER, MINNESOTA.

BICYCLE-PROP.

SPECIFICATION forming part of Letters Patent No. 717,271, dated December 30, 1902.

Application filed May 7, 1902. Serial No. 106,331. (No model.)

*To all whom it may concern:*

Be it known that I, JENS RASMUSSON, a citizen of the United States, residing at Rochester, in the county of Olmsted and State of Minnesota, have invented new and useful Improvements in Bicycle-Props, of which the following is a specification.

My invention relates to bicycle-props; and the object of the same is to construct a simple device of this character for supporting a wheel and which can be folded up and carried by the rider.

The novel construction employed by me in carrying out my invention is fully described in this specification and claimed, and illustrated in the accompanying drawings, forming a part thereof, in which—

Figure 1 is a side elevation of a bicycle supported by my prop. Fig. 2 is a perspective of my rack set up. Fig. 3 is an elevation of the same folded. Fig. 4 is a detail section of the stem. Fig. 5 is a detail of a modified form of springs for expanding the legs.

Like numerals of reference designate like parts in the different views of the drawings.

The numeral 1 designates a hollow stem plugged at 2 and traversed by a longitudinally-extending slot 3, within which is mounted a rack-bar 4, bearing a series of teeth 5, beveled in one direction. The rack 4 is resilient, is rigidly secured at its lower end at 6, but is free at its upper end. A pin 7, bearing a head $7^a$, is seated in the upper end of the rack 4 and extends through an aperture 8 in a sleeve 9, fitted over the upper end of the stem 1. The pin 7 serves as a thumb-piece for operating the rack 4 to disengage it, and the head $7^a$ limits the inward movement thereof. The sleeve 9 has an apertured lug 10 formed integral therewith, to which is pivoted a head 11, having an inclined rounded face 12 formed thereon and adapted to engage the front diagonal bar 13 of the frame of a bicycle. A clip 14 serves to hold it firmly in place, although this may be dispensed with.

A collar 15 is slidingly mounted on the stem 1 and is recessed at 16 to adapt it to be engaged by the teeth 5 of the rack-bar 4 to normally prevent its upward movement. Ears 17 are formed on the collar 15, to which legs 18 are pivoted. Brace-rods 19, pivoted at one end to the legs intermediate their ends and at their other ends to ears formed on a collar 20, rigidly mounted on the lower end of the stem 1, serve to support the legs. By this arrangement the spread of the legs can be regulated. A fork 21 is carried by the sliding collar 15 and is located to engage the tire 22 of the front wheel 23 of a bicycle. Curved spring-arms 24, mounted on the stem 1, serve to engage the sides of the legs 18.

In operation my rack is set up, as shown in Fig. 1, with the face 12 engaging the bar 13. The pin 7 is then forced back to release the collar 15, when the springs 24 will force the legs 18 outwardly, expanding them. The fork 21 is then set to engage the tire of the front wheel, and the teeth 5 on the rack will hold the collar 15 against all upward movement. When it is desired to fold the rack, the pin 7 is once more forced back to release the collar 15, which is then grasped in one hand and pushed up until it is engaged by the ratchet $5^a$ on the upper end of the rack. The legs 18 will engage the springs 24 and restore them to their initial positions.

I do not wish to be limited as to details of construction, as these may be modified in many particulars without departing from the spirit of my invention.

Having described my invention, what I claim as new, and desire to secure by Letters Patent, is—

1. In a bicycle-rack, the combination of a stem, a head mounted on the upper end of said stem and having an inclined face constructed to engage the frame of a bicycle, a rack-bar mounted on said stem, a collar mounted on said stem and engaged by said rack-bar, a fork carried by said collar and constructed to engage the front wheel of a bicycle, legs pivoted to said collar, and braces positively connected to said legs and to said stem, whereby the height of said fork above the ground may be adjusted, substantially as described.

2. In a bicycle-rack, the combination of a stem, a head mounted on said stem and constructed to engage the front bar of a bicycle-frame, a collar slidingly mounted on said stem and bearing a fork constructed to engage the front wheel of a bicycle, means for securing said collar at any point, legs pivoted to said collar, and braces positively connected to said legs and to said stem, whereby the height of said fork above the ground may be adjusted, substantially as described.

In testimony whereof I have hereunto set my hand in presence of two subscribing witnesses.

JENS RASMUSSON.

Witnesses:
 CHAS. S. ALLEN,
 GEORGE J. ALLEN.